Patented Apr. 20, 1937

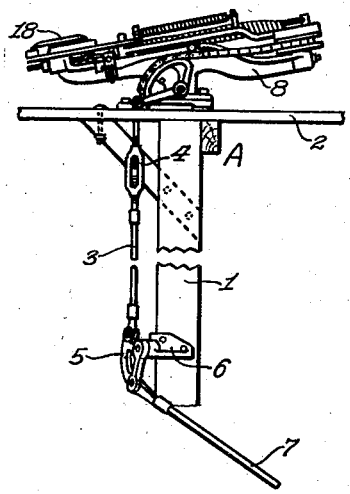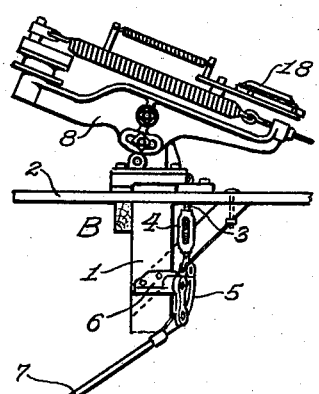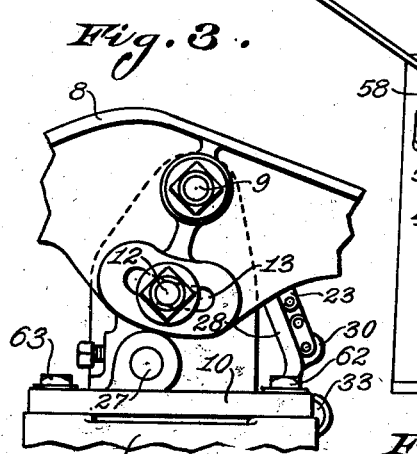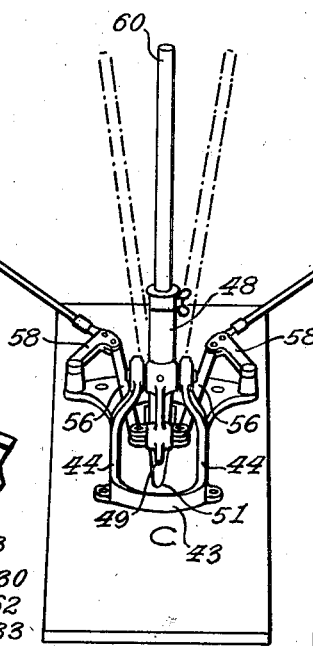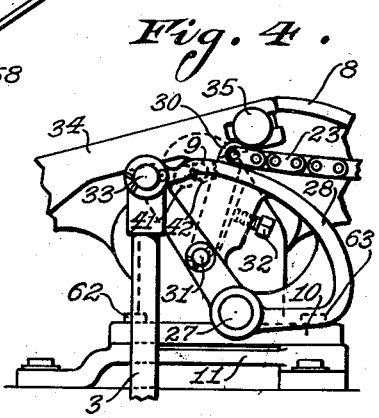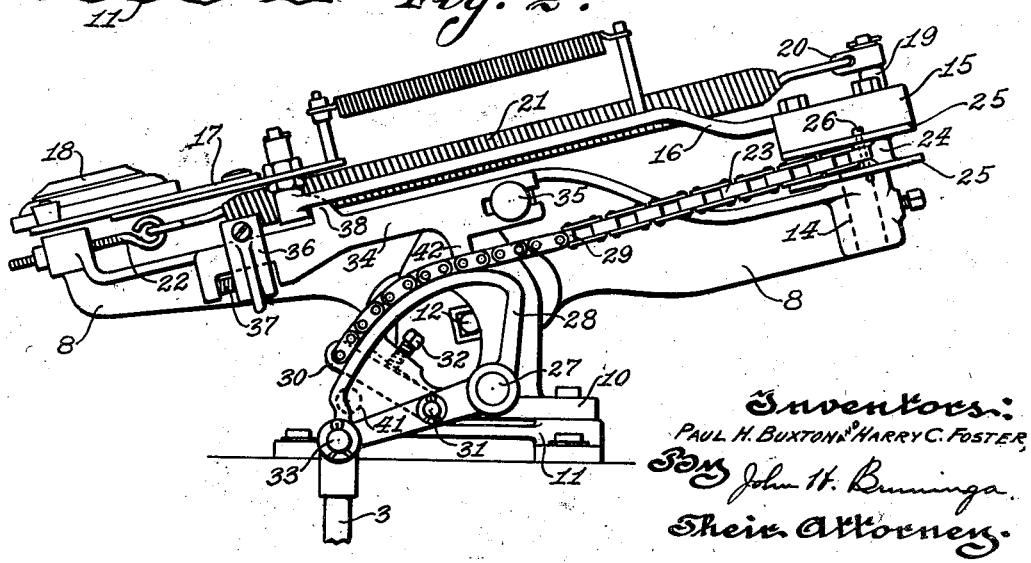

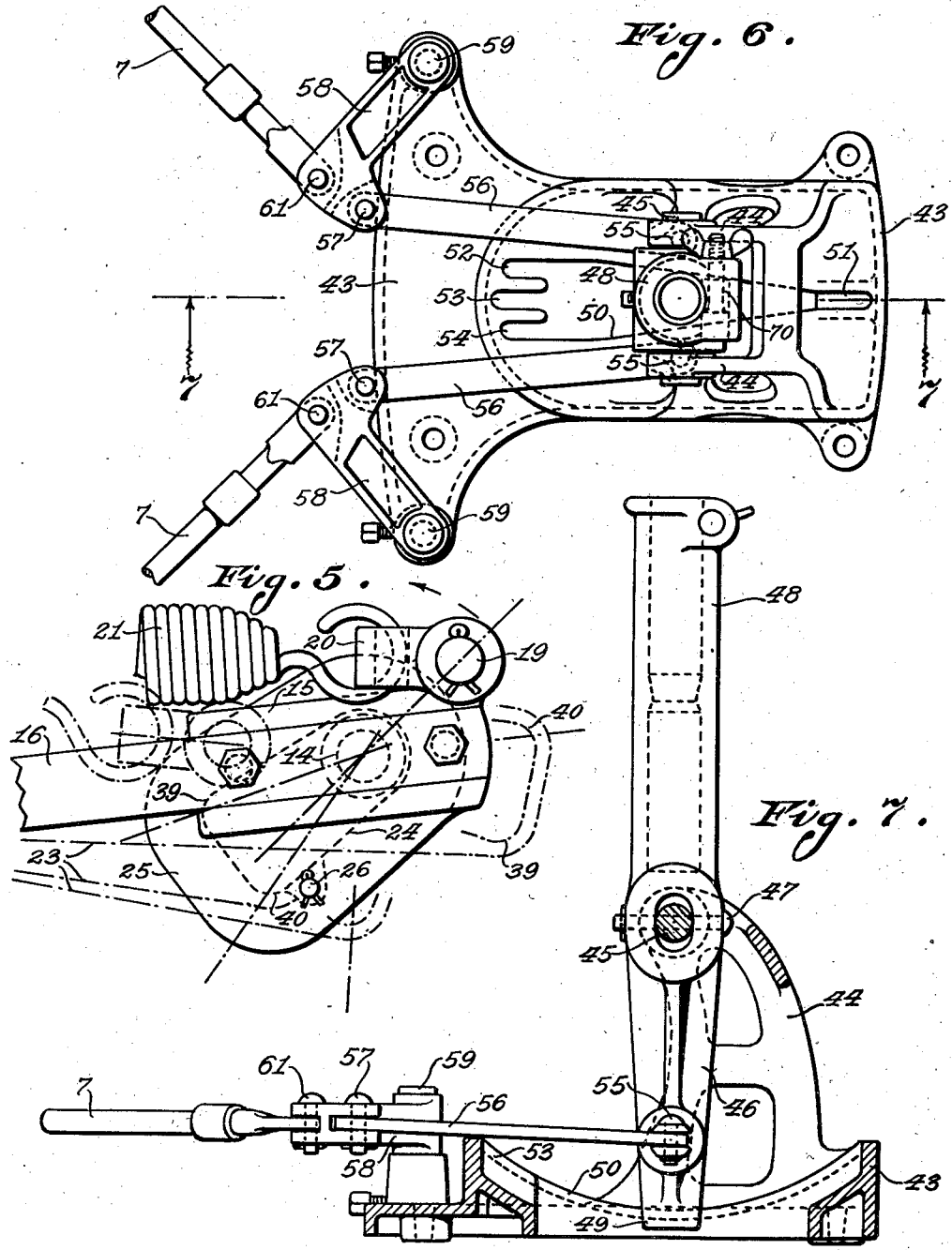

2,077,672

UNITED STATES PATENT OFFICE 2,077,672

TRAP SHOOTING APPARATUS

Paul H. Buxton and Harry C. Foster, East Alton, Ill., assignors to Western Cartridge Company, East Alton, Ill., a corporation of Delaware Application August 5, 1932, Serial No. 627,568

2 Claims. (Cl. 124—3)

This invention pertains to trap shooting apparatus and more particularly to apparatus for use in so-called skeet shooting.

In the game of skeet shooting two target traps are used to throw the disk targets known as clay pigeons. These traps are mounted in suitable houses at points spaced a specified distance from one another. One trap is usually mounted at a considerable elevation, while the other is mounted nearer to the ground. A series of shooting stations is laid off in an arc joining the two trap houses. The contestant takes post successively at each of these stations and the targets are released from either one or both of the traps.

One of the objects of this invention is to provide a target trap and means for controlling the same, adapted for use in this game of skeet shooting.

Another object is to provide controlling means whereby the traps may be operated entirely, as to setting and releasing the same, from a single operating station.

Another object is to provide such controlling means whereby either one or both of the traps may be released from a single controlling station. Another object is to provide an improved trap mechanism for use in connection with such automatic controlling means.

Further objects will appear from the following description taken in connection with the accompanying drawings in which:

Figure 1 is a view in somewhat diagrammatic form of a system of traps and controlling connections and devices embodying this invention.

Figure 2 is a right hand side view of a trap embodying this invention.

Figure 3 is a fragmentary view of the left hand side of the trap.

Figure 4 is a detail of the trap shown in Figure 2 with the control device shown in released position.

Figure 5 is an enlarged detail in plan view of the trap of Figure 2.

Figure 6 is a plan view of the operating mechanism at the control station.

Figure 7 is a section taken on line 7—7 of Figure 6.

Referring now to the drawings A represents one of the target stations, B the other target station, and C the control station. In the drawings only the supports for the traps are shown at stations A and B. In practice each of these will be included in a suitable housing so as to protect the trap and the operator who loads it with targets against danger from the fire of the contestant.

In Figure 1, 1 represents a suitable support, usually constructed of timbers and provided with a platform 2 upon which the target trap is mounted; an operating rod 3, adjustable in length by means of a turn buckle 4 or other suitable device is connected to the trap as will be more fully explained hereinafter. The lower end of this rod is pivoted to a bell crank 5, pivoted on a bracket 6 on the support 1. The bell crank 5 has pivoted thereto, a stiff reach rod or pipe 7 extending to the control station C. The control mechanism is such as to exert either a thrust or tension on the rods 7 in accordance with the way in which each trap is to be operated.

The trap itself, as shown in Figures 2 to 5, comprises a frame 8 pivoted on a stud 9 to a support 10 which is adjustably mounted on a sub-base 11 which may be bolted to the platform 2. The position of the frame 8 on the pivot 9 is fixed by a clamping stud 12 working in a slot 13 in the frame 8. This provides that the trap may be set to launch the target at any desired angle with respect to the horizontal. Suitably journaled in the frame 8 on a pivot shaft 14 is a rotary head 15 carrying a target throwing arm 16. The arm 16 may be of any suitable construction well known in the art, and carries at its other end a target holder 17 adapted to receive the target 18.

Pivoted at 19 on the head 15 is a swivel hook or ring 20 to which one end of the main spring 21 is secured. The other end of the spring 21 is secured to an adjusting screw 22 at the other end of the frame 8. The pivot 19 is off-set laterally with respect to the arm 16 in the "set" position of the arm as shown in Figure 5 so that tension of the spring 21 will tend to swing the arm 16 in counter-clockwise direction on the pivot 14. The head 15 is provided with a drum 24 of special shape extending outwardly from the pivot 14 and provided with flanges 25. Secured at 26 to the drum 24 is a flexible chain 23, providing a tension element cooperating with the drum 24 for moving the arm 16 to set position against the tension of the spring 21.

Pivoted at 27 on the support 10 is a quadrant 28 to which the other end of the chain 23 is secured. It will be noted that this chain is made in two sections having a block 29 inserted therein at which the links are turned through a right angle so that the chain may flex about the quadrant 28 in a direction at right angles to its flexure about the drum 24. The end of the chain 23 is really secured not directly to the quadrant 28 but to an arm 30 pivoted at 31 on the quadrant 28 and extending through a slot therein to the circumference of the arcuate portion thereof. The arm 30 rests against an adjusting screw 32, by which the effective length of the chain 23 may be adjusted as will be more fully explained hereinafter. The outer end of the quadrant 28 is pivoted at 33 to the control rod 3. A sear 34 is arranged to slide on a pin 35 and in a bracket 36 on the frame 8 and is controlled by a spring 37. The sear 34 has an upstanding tooth 38 adapted to engage a corresponding tooth on the arm 16 so as to retain said arm in set position.

It will be noted from Figure 5 that the drum 24 is of special form so that the chain 23 as it wraps about said drum may act at a variable leverage with respect to the shaft 14. The shape of this drum is such that there are two points of maximum leverage during its rotation about the shaft 14. One of these occurs when the chain is rounding the point 39 of the drum, and the other occurs when the chain is rounding the point 40 thereof. It will be noted that the angular positions of the high points 39 and 40 of the drum 24 with respect to the pivot 19 are such that one of these points is positioned on either side of the center line passing through the centers of the pin 19 and the shaft 14. The initial position of the chain 23 before tensioning the spring 21 is indicated in dotted lines in Figure 5 and the corresponding position of the drum 24 is illustrated in dotted lines on the opposite side of the pivot shaft 14. When the trap is to be set the parts start from this position and tension is put upon the chain 23 by tension on the rod 3 acting through the quadrant 28. In response to such tension, the head 15 rotates in clockwise direction about the shaft 14. During this movement the spring 21 is stretched and as the radius of the pin 19 moves toward a position of right angles with respect to the spring 21, said spring acts at an increasing mechanical advantage on the head 15. During such movement, however, the drum 14 moves toward a position such that the radius of the point 39 approaches a right angle relation with the chain 23 which is indicated in Figure 5 in broken lines. From the angular relation of the parts, it will be seen that the point 39 arrives at the right angle position before the pin 19 arrives at its right angle position. Accordingly the chain 23 also acts at an increasing mechanical advantage and its leverage increases as that of the spring increases but in advance thereof. As the pin 19 passes its position of right angles, the leverage or mechanical advantage of the spring 21 decreases. That of the chain 23, however, is maintained until the point 40 of the drum passes its right angle position. Accordingly the mechanical advantage of the chain is maintained in excess of that of the spring substantially throughout its movement. The result of this arrangement is that the tension required to set the trap does not increase indefinitely as the tension of the spring 21 increases and when the spring has reached its full tension, the effort necessary to move the arm 16 is not excessive. In fact this tension is almost uniform and a better control is obtained toward the end of the movement. It has been found that this control is so nice that the operator can tell by the pull on the handle of the control device just about what position the trap is in and can actually feel the action of the arm in snapping past the sear 34. Accordingly, the operator is enabled to know just exactly when his trap is set. This is a great advantage in a device which is controlled entirely from a remote station.

The arm 16 is released by means of a thrust exerted on the rod 3. Such a thrust acts to move the quadrant 28 to the position illustrated in Figure 4. In this position a lug 41 on the inner side of the quadrant 28 comes into engagement with a downwardly extending dog 42 on the sear 34. The lug 41 forces the sear to the right, Figure 2, and releases the arm 16. It will be noted that the point of engagement between the lug 41 and the dog 42 comes just opposite the pivot stud 9 as will be seen in Figure 4. Accordingly, adjustment of the frame 8 about the pivot 9 will have no effect on the point of release of the sear and will, therefore, not disturb the adjustment of the rod 3.

The support 10 is pivoted on the sub-base 11 at the stud 62 for adjustment in horizontal direction, the stud 63 working in an arcuate slot in the sub-base 11. The quadrant 28 is so positioned that the rod 3 comes up closely adjacent the pivot stud 62. Accordingly adjustments for direction will not disturb the adjustment of the rod 3.

The relation of the movement of the control rod 3 to the point at which the tooth 38 of the sear catches the arm 16 may be accurately adjusted by means of the screw 32 which varies the position of the chain 23 with respect to the quadrant 28.

The mechanism at the control station C comprises a base 43, usually in the form of a casting provided with a pair of upstanding arms 44, in which is journaled a pivot pin 45. An operating arm 46 embraces the pin 45 and is pivoted thereon for lateral movement by a pivot pin 47 passing through the pin 45. In this way the arm 46 is pivoted for universal movement on the arms 44. The upper end of the arm 46 may be formed into a socket 48, adapted to receive a handle 60, of any suitable type secured by a transverse wedge bolt 70 having an enlarged head tapering to a reduced shank as shown. The lower end of the arm 46 terminates in a dog 49, moving in a guide opening 50 in the base 43. This guide opening is of special form tapering toward the rear to a narrow slot 51. The forward end of the opening 50 is provided with three notches 52, 53 and 54. On account of the fact that it is universally pivoted, the arm 46 may move rearwardly into the slot 51, or forwardly into either of the notches 52, 53 or 54.

Loosely pivoted at 55 on each side of the arm 46 is a link 56, whose other end is pivoted at 57 to an arm 58 pivoted at 59 for horizontal movement on the base 43. One of the thrust rods 7 is also pivoted at 61 to each of the arms 58.

It will be noted that when the arm 46 is moved rearwardly or to the right, Figure 7, the dog 49 is guided into the slot 51. This exerts tension on the links 56 and moves them both in equal amount. In the forward movement of the dog 49, however, the same may be moved into one of the side notches 52 or 54. In that case thrust will be exerted on the links 56 and, therefore, on the rods 7. The extent of movement will, however, be greater for one link than for the other and a corresponding difference of movement will be impressed on the rods 7. When the notch 52 is used, the upper arm 7 of Figure 6 will receive a greater movement than the lower arm and vice versa when the notch 54 is used. When the dog is moved into the center notch 53, the forward movement of both links 56 and both rods 7 is alike.

It will be noted that each of the rods 7 extends in a definite direction and that the arm 58 is so arranged with reference thereto as to maintain its direction of action substantially the same. Accordingly by movement of the rod 7, or the arm 58, a directed impulse may be transmitted along the rod 7. Furthermore since the rod is capable of exerting either a tension, or a thrust, it is capable of transmitting differently directed impulses. Each type of impulse is capable of producing its own particular result at the trap to which this rod is connected. The manipulative arm 46 acting through the link 56 is adapted to control the type of impulse transmitted to the rod 7 and also its magnitude. It will be noted that in the case of the upper rod 7 (Figure 6) when the arm 46 is passed into the guide slot 52 it transmits an effort or impulse along the link 56 to the rod 7. The impulse transmitting along the link 56 has in this case a definite direction more or less angular to the direction of the rod 7, or in other words to the direction of transmission of the impulse along the rod 7. Since the impulse of the link 56 is in a direction angular to the direction of the rod 7, said impulse may be said to have components directed along and transversely to the direction of the rod 7. In other words the thrust of the link 56 may be resolved into two components, one of which is in line with the rod 7 and the other perpendicular thereto.

The relative magnitude of these two components depends on the angle which the link 56 makes with the rod 7. Accordingly these relative magnitudes may be varied or controlled by varying the angularity of the link 56. This, of course, may be done by means of the control arm 46. When this arm is passed into the guide slot 53 this angularity will be different than when the slot 52 is used. Only that component of the thrust of the link 56 which is taken along the rod 7 is effective in operating the trap connected to the other end of said rod. Accordingly by controlling the angularity of the link 56 the effect on the trap may be controlled. As the transverse component of the movement of the link 56 has no effect on the rod 7 this transverse component may be disregarded.

It will be seen, therefore, that in accordance with this invention a connection 7 between the trap and the control station is provided capable of transmitting a directed impulse. The control mechanism is such as to transmit to the connection 7 an impulse whose components directed along and transversely to said connection can be varied as desired and by such a variation the actual movement or impulse applied to the connection 7 is controlled. It will be seen that when the control arm 46 is moved to either of the slots 52 or 54 the relative magnitude of the longitudinal and transverse components of the impulses transmitted to the two rods 7 are varied, the longitudinal component of one being increased while that of the other is decreased. In this way selective impulses may be transmitted to different traps.

The operation of this device is as follows:—
The traps, having been set up and properly adjusted by adjustment of the turn buckles 4, the operator sets both traps by pushing forwardly or to the left, Figure 7 on the handle 60. This moves the arm 46 to the rear and the dog 49, being guided into the notch 51, equal tension is exerted on the links 56 and through them on the rods 7. Each of these rods in turn exerts a downward tension on the rod 3. This pulls the quadrant 28 downwardly to the position of Figure 2 and exerts tension on the chain 23. This chain swings the arm 16 in a clockwise direction against the tension of the spring 21 until the hook on the arm engages the tooth 38 on the sear 34. This sets the trap, the arm being held in set position by the sear 34. The target boys in the trap houses now quickly insert targets in the holders and both traps are ready for firing. The operator now pulls to the rear or to the right, Figure 7, on the handle 60. This exerts thrusts on the links 56 and on the rods 7. If the dog 49 is moved into the center notch 53 a sufficient movement is given to each of the rods 7 and through them to the rods 3 to swing both quadrants 28 up to the position of Figure 4, so that the lugs 41 engage the dogs 42 and move the sears 34 to a sufficient extent to release the arms 16. When the arms are thus released, the springs 21 swing them forward to launch the targets. If, however, on the forward movement of the arm 46 the dog 49 is inserted in one of the side notches, say 52, the upper link 56 of Figure 6 will be given a greater movement than the lower one. The adjustment is such that this movement will be effective in releasing the trap at station B, while the movement of the other link and rod 7 will be insufficient to release the trap at station A. If the dog 49 is moved into the notch 54, conditions will be reversed and the trap at station A will be released while that at station B will not. Thus the operator at station C has complete control of setting and releasing the traps either simultaneously or either one may be released at will. This effect is obtained by providing that the control apparatus at station C is arranged to exert either thrust or tension on the rods 7, and arranging the trap so that one of these efforts will set the trap while the other will release it.

It will be seen, therefore, that this invention accomplishes its objects in providing trap shooting apparatus in which a plurality of traps may be set and released in any desired order from a single control station. The arrangement of the control apparatus is such that a simple forward movement of the handle sets both traps. Leverages are so arranged that the handle acts at a mechanical advantage which increases faster than that of the spring against which it works and this advantage is maintained after that of the spring begins to decrease. Accordingly, in spite of the fact that the operator must set two traps at once his leverage is such that he can tell what positions the traps are in and can in fact feel when each one engages its sear. Once the traps are set and loaded, either one or two targets may be launched in accordance with the requirements of the shooting game. The construction of the trap is such that it may be adjusted for the direction of throwing the target without derranging its adjustment with respect to the control station.

While his device has been described as a unitary system, it will be understood, of course, that individual features and sub-combinations thereof are of utility without reference to the other features.

It is understood, therefore, that the employment of such individual features or sub-combinations is contemplated by this invention. It is also obvious that various changes in details of construction may be made, within the scope of the appended claims, without departing from the spirit of this invention and that the invention is not limited to the specific details shown and/or described.

Having thus described the invention, what is claimed is:

1. Controlling means for target traps, comprising, a pair of thrust members connected to operate separate traps, an operating handle, means for guiding said handle for movement in one direction to exert tension on said members to set the traps, said handle being movable in the opposite direction to exert thrust on said members to release the traps, connections between said handle and said members constructed and arranged so that movement of said handle in a direction deviating slightly from said opposite direction will release one trap only, and closely adjacent substantially parallel guides for said handle selectively engageable thereby for controlling the movement thereof to release either or both traps.

2. Controlling means for target traps, comprising, a pair of thrust members connected to operate separate traps, an operating handle, means for guiding said handle for movement in one direction for setting said traps, said handle being movable in the opposite direction for releasing the traps and connected to said thrust members, and closely adjacent substantially parallel guides positioned for selective engagement by said handle when moved in releasing direction, one of said guides controlling said handle to move one of said members to release its trap, another of said guides controlling said handle to move the other of said members to release its trap, and another of said guides controlling said handle to move both said member to release both traps.

PAUL H. BUXTON.
HARRY C. FOSTER.